United States Patent
Wicklund, Jr.

(10) Patent No.: US 7,681,315 B2
(45) Date of Patent: Mar. 23, 2010

(54) CLAMPING PLIERS

(76) Inventor: James Vanerd Wicklund, Jr., 94-363 Puaahi Pl., Mililani, HI (US) 96789

( * ) Notice: Subject to any disclaimer, the term of this patent is extended or adjusted under 35 U.S.C. 154(b) by 397 days.

(21) Appl. No.: 10/563,809

(22) PCT Filed: Jul. 9, 2004

(86) PCT No.: PCT/US2004/021827
§ 371 (c)(1),
(2), (4) Date: May 2, 2007

(87) PCT Pub. No.: WO2005/008078
PCT Pub. Date: Jan. 27, 2005

(65) Prior Publication Data
US 2007/0289417 A1 Dec. 20, 2007

Related U.S. Application Data

(60) Provisional application No. 60/485,749, filed on Jul. 10, 2003.

(51) Int. Cl.
*B23D 21/06* (2006.01)
*B26F 1/00* (2006.01)
(52) U.S. Cl. .............................. 30/92; 30/92.5; 30/93; 30/101; 30/102; 30/361
(58) Field of Classification Search .................. 30/92, 30/92.5, 93, 101, 102, 361
See application file for complete search history.

(56) References Cited

U.S. PATENT DOCUMENTS

| | | | |
|---|---|---|---|
| 3,066,564 A | 12/1962 | Carpenter | |
| 3,093,023 A * | 6/1963 | Vail | 83/370 |
| 3,284,895 A * | 11/1966 | Selander et al. | 30/92 |
| 3,755,896 A | 9/1973 | Tommerup | |
| 3,861,035 A * | 1/1975 | Ramey et al. | 30/92 |
| 4,633,862 A | 1/1987 | Petersen | |
| 4,962,588 A | 10/1990 | Fushiya et al. | |
| 5,303,471 A | 4/1994 | Liberatoscioli | |
| 5,632,089 A | 5/1997 | Sakamoto et al. | |
| 5,806,187 A | 9/1998 | Ducret | |
| 6,128,943 A * | 10/2000 | Lemmens | 72/409.01 |

FOREIGN PATENT DOCUMENTS

JP 2001-293648 A 10/2001

* cited by examiner

*Primary Examiner*—Ghassem Alie
*Assistant Examiner*—Bharat C Patel
(74) *Attorney, Agent, or Firm*—Birch, Stewart, Kolasch & Birch, LLP

(57) ABSTRACT

A clamping tool for use with a power tool includes a housing mounted on a power tool. The housing includes at least one engaging portion. The locking pliers includes a retaining section with a proximal end and a distal end. The proximal end is mounted on the at least one engaging portion for retain the locking pliers in a selectively, releasably, rotational relationship relative to the housing. An engaging section of the locking pliers is mounted relative to the retaining section and is selectively locked relative to the distal end of the retaining section for positioning an article therebetween. In two embodiments, after an article is locked in the locking pliers, the locking pliers can be rotated either away from or towards the housing to permit the power tool to come into engagement with an article.

17 Claims, 15 Drawing Sheets

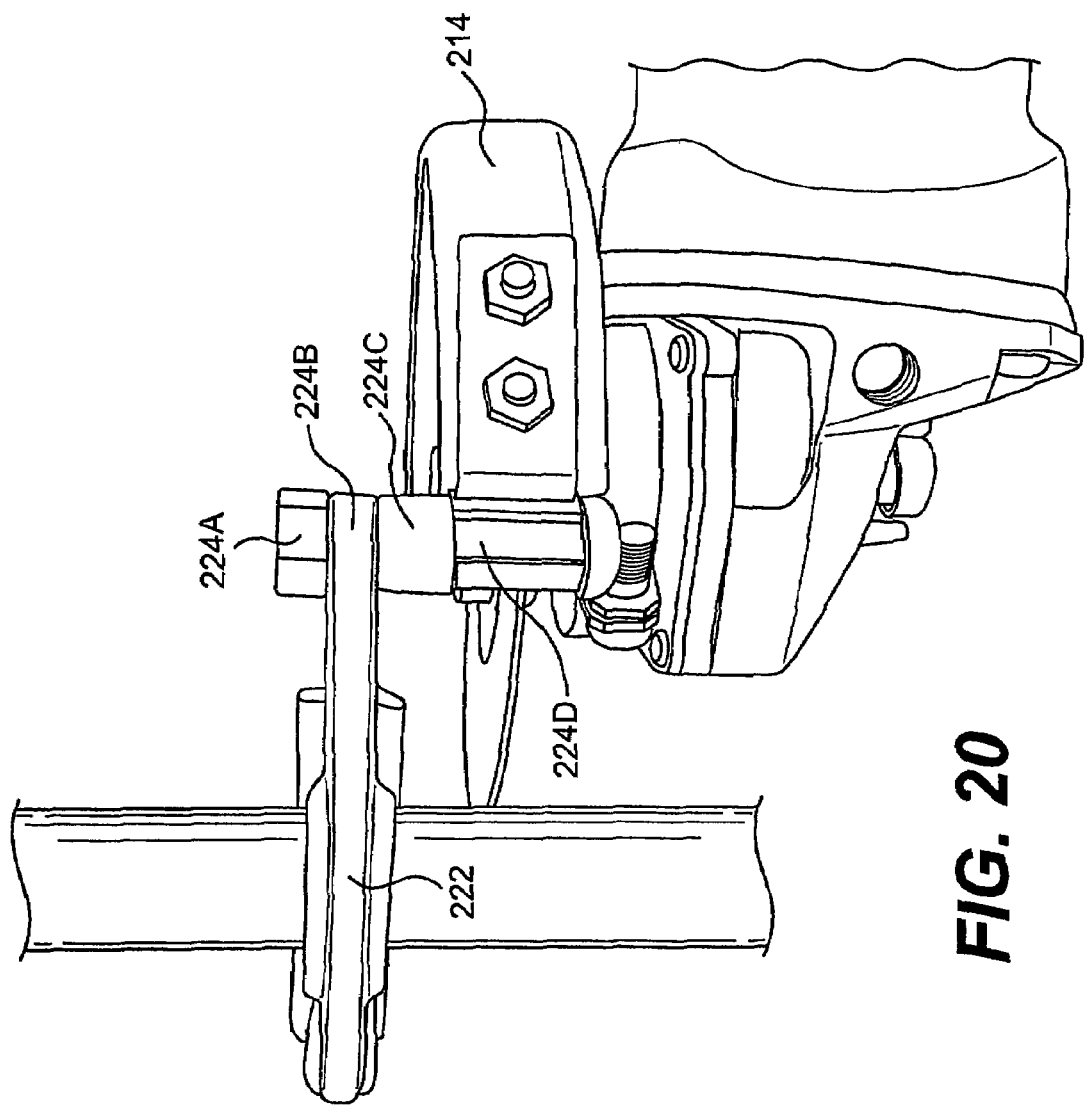

CLAMPING PLIERS

CROSS-REFERENCE TO RELATED APPLICATIONS

This National Phase PCT application claims priority under 35 U.S.C. 119(e) on U.S. Provisional Application No. 60/485,749 filed on Jul. 10, 2003 which is hereby incorporated by reference.

BACKGROUND OF THE INVENTION

1. Field of the Invention

A locking pliers for use with a power tool wherein a housing is mounted on a power tool and locking pliers are selectively, releasably, rotatably mounted relative to the power tool to permit an article retained by the locking pliers to be brought into engagement with the power tool.

2. Description of Background Art

Heretofore, when an individual utilized a power tool it was necessary to use one hand to actuate and control the operation of the power tool while using the other hand to hold an article to be brought into engagement with the power tool. For example, if an individual desired to cut an article such as a pipe, angle iron, cable or wire, it was necessary to hold the cutting tool in one hand and then bring the article into engagement with the cutting tool with the other hand. Depending on the size, length or orientation of article, it was difficult to accurately cut the article.

As a solution to this problem, it is possible to place the article or workpiece in a vise. Thus, an individual would have two hands to operate the cutting tool. However, when an individual is working in the field, it is not always possible to have a vise handy to permit the article to be placed in the vise.

SUMMARY AND OBJECTS OF THE INVENTION

The present invention solves the problems with regard to the operation of a power tool by permitting an individual to hold an article in a locking pliers that is mounted for rotation relative to the power tool.

The present invention permits an individual to use two hands to control the operation of the power tool and the locking plier.

The present invention permits an individual to accurately work on an article to cut a "square" cut when the individual is dispatched to the field.

These and other objects of the present invention are achieved by providing a locking pliers for use with a power tool that includes a housing mounted on a power tool. The housing includes at least one engaging portion. A locking pliers is provided having a retaining section with a proximal end and a distal end. The proximal end is mounted on at least one engaging portion to retain the locking pliers in a selectively releasable, rotatable relationship relative to the housing. An engaging section of the pliers is mounted relative to the retaining section and is selectively locked relative to the distal end of the retaining section for positioning an article therebetween. When an article is locked relative to the distal end of the retaining section and the engaging section of the locking pliers, the proximal end of the retaining section can be rotated relative to the housing to permit the power tool to come into engagement with an article. In this embodiment, the locking pliers and the power tool are separated relative to each other to permit the power tool to cut the article.

In another embodiment, the housing is mounted on a power tool. The housing includes at least one engaging portion. The locking pliers are provided with a retaining section with a proximal end and a distal end. The distal end is mounted on at least one engaging portion to retain the locking pliers in a selectively releasable, rotatable relationship relative to the housing. An engaging section of the pliers is mounted relative to a locking section and is selectively locked relative thereto for positioning an article therebetween. When an article is locked relative to the locking section and the engaging section of the locking pliers, the distal end of the retaining section can be rotated relative to the housing to permit the power tool to come into engagement with an article. In this embodiment, the locking pliers and the power tool are brought closer together relative to each other to permit the power tool to cut the article.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 20 is a side view illustrating the positioning of the distal end of the retaining section relative to the engaging portion of the housing of the second embodiment with an article, retained by the proximal end of the retaining section, being brought into engagement with a power tool by moving the locking pliers towards the power tool.

DETAILED DESCRIPTION OF THE PREFERRED EMBODIMENTS

Figure 1:
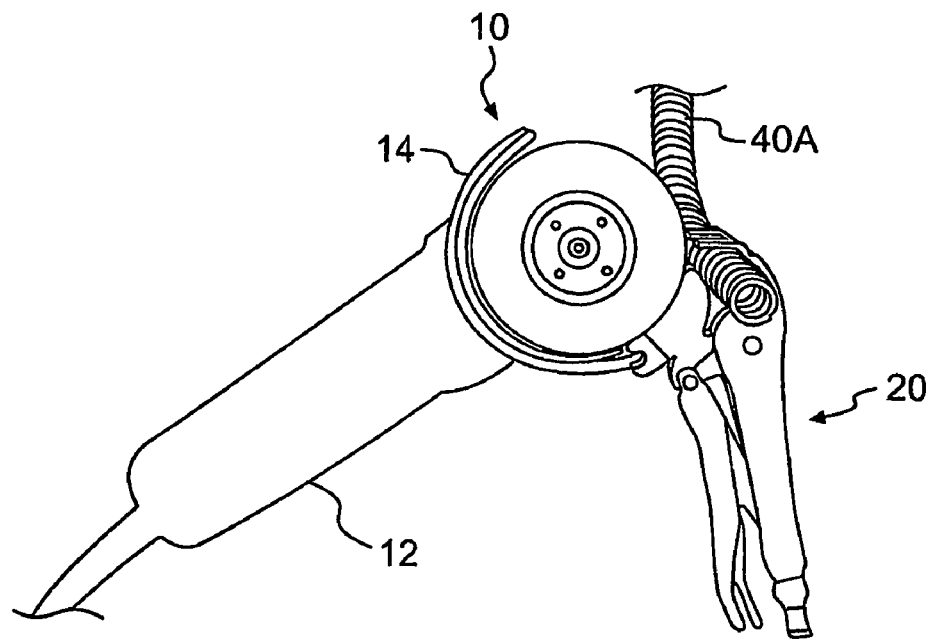
FIG. 1 is a perspective view illustrating a housing mounted on a power tool with a locking pliers rotatably mounted relative to the housing for accurately bringing an article into engagement with the power tool.
Figure 2:
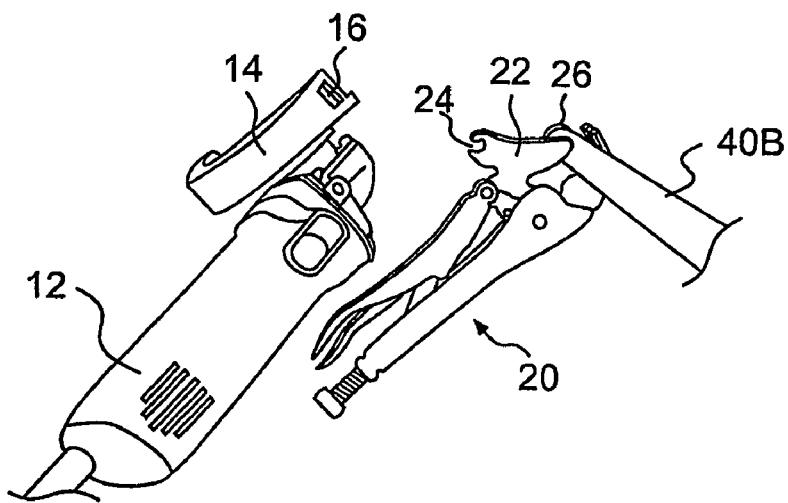
FIG. 2 is a view illustrating the locking pliers disengaged relative to the housing and illustrating an article being locked relative to a distal end of a retaining section and an engaging section of the locking pliers.
Figure 3:
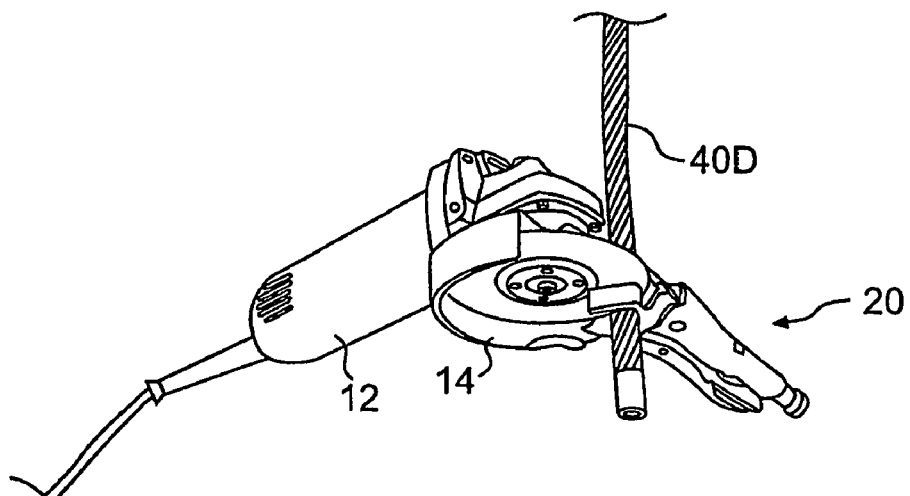
FIG. 3 is a perspective view illustrating the housing mounted on the power tool with the locking pliers positioning an article that may be brought into engagement with the power tool.
Figure 4:
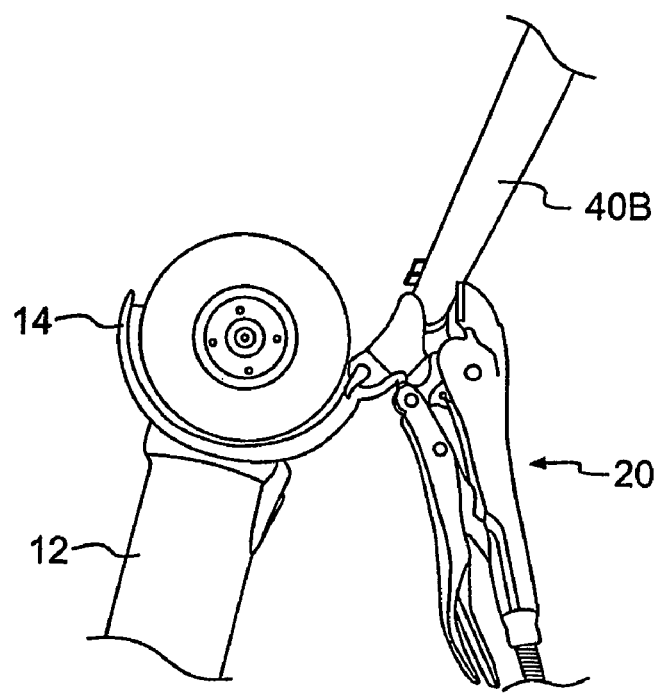
FIG. 4 is a top view illustrating the housing mounted on the power tool with the locking pliers positioning an article that may be brought into engagement with the power tool.
Figure 5:
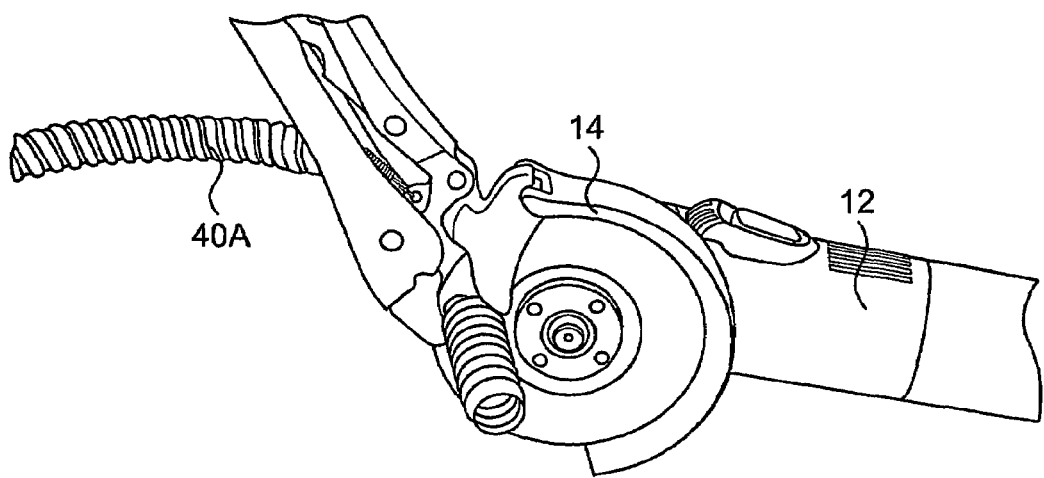
FIG. 5 is a side view illustrating the housing mounted on the power tool with the locking pliers positioning an article that may be brought into engagement with the power tool.
Figure 6:
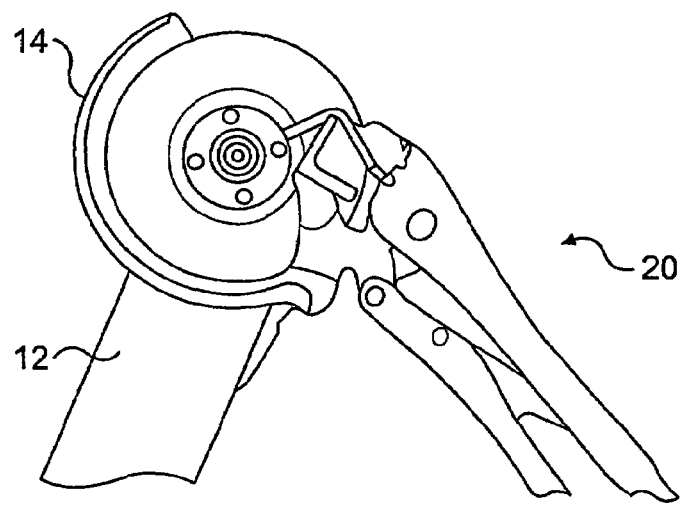
FIG. 6 is a side view illustrating the housing mounted on the power tool with the locking pliers positioning an article that may be brought into engagement with the power tool.
Figure 7:
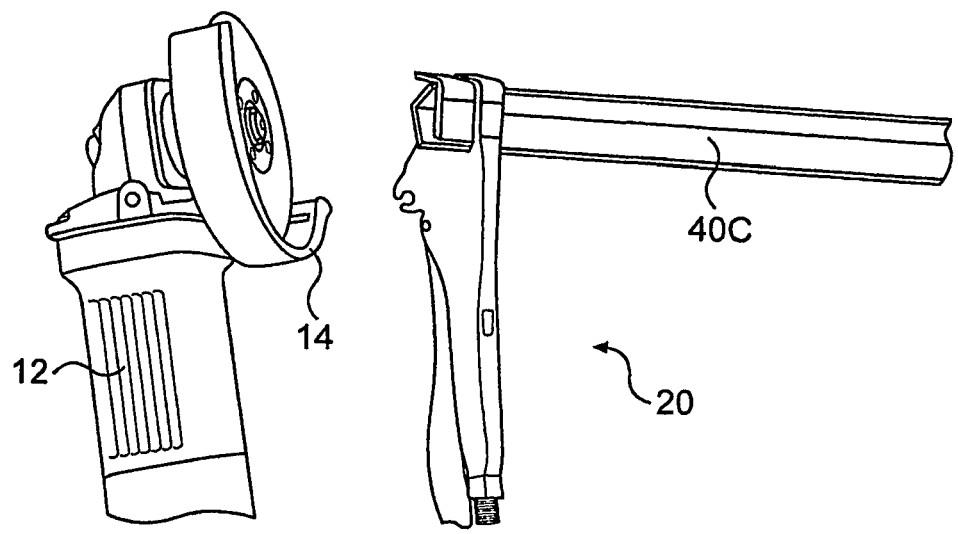
FIG. 7 is a top view illustrating the housing mounted on the power tool with the locking pliers being disengaged therefrom and positioning an article that may be brought into engagement with the power tool.
Figure 8:
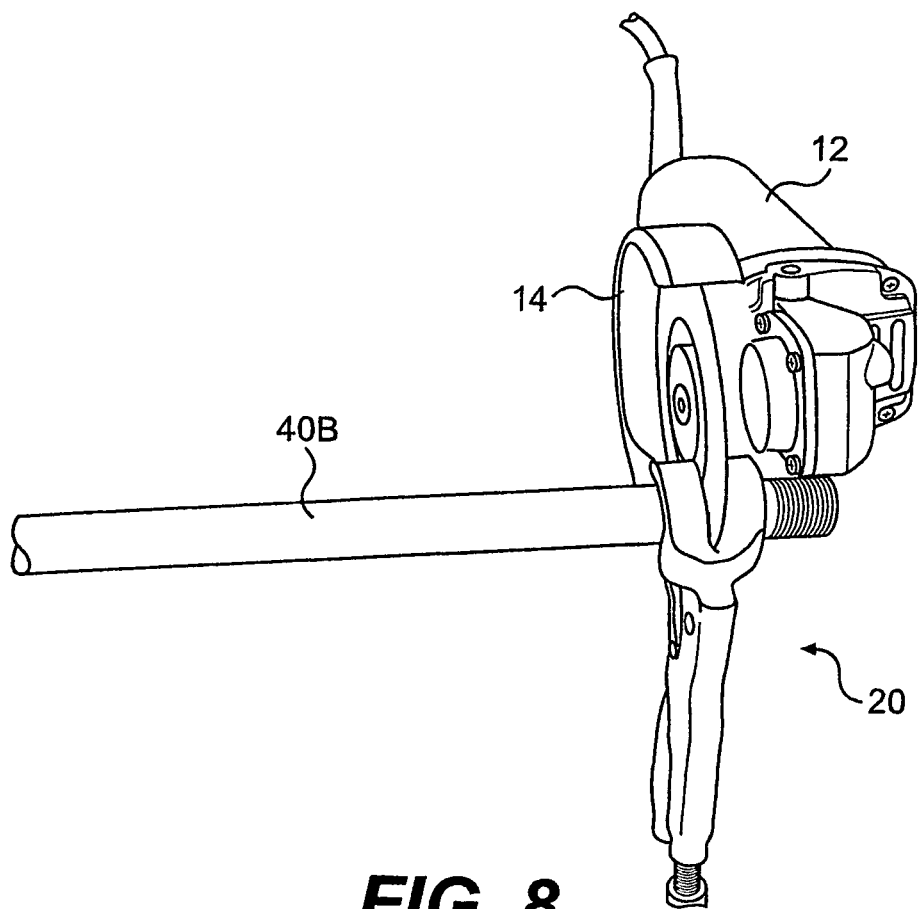
FIG. 8 is a side view illustrating the housing mounted on the power tool with the locking pliers positioning an article that may be brought into engagement with the power tool.
Figure 9:
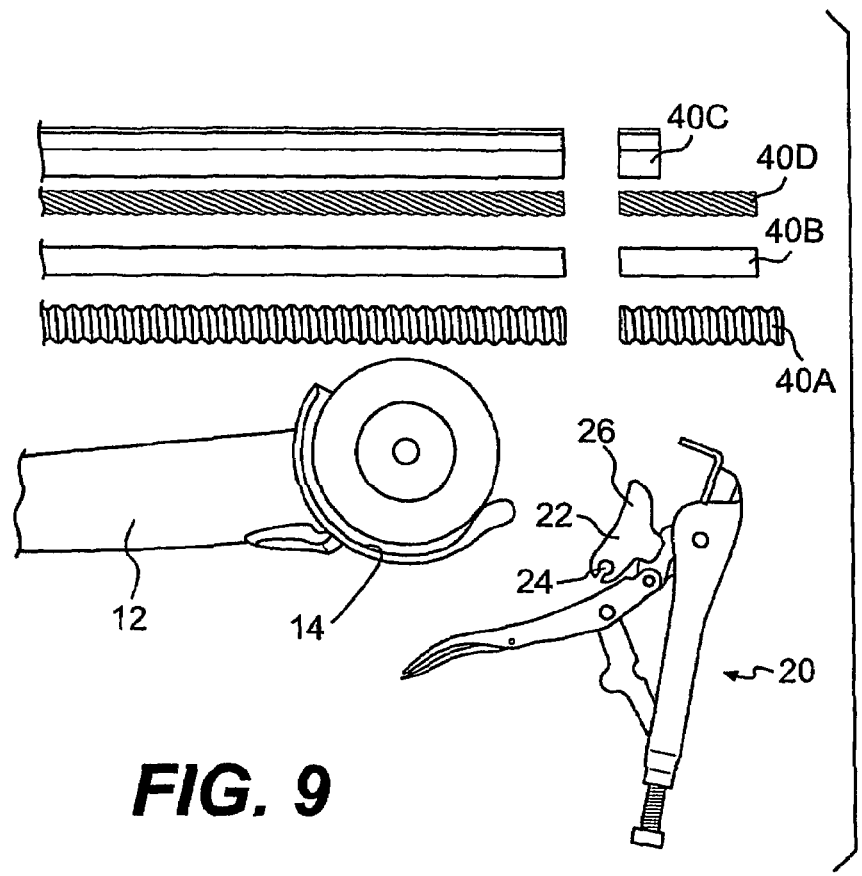
FIG. 9 is a side view illustrating the housing mounted on the power tool with the locking pliers positioned adjacent thereto and a plurality of articles that may be brought into engagement with the power tool being illustrated adjacent to the power tool.
Figure 10:
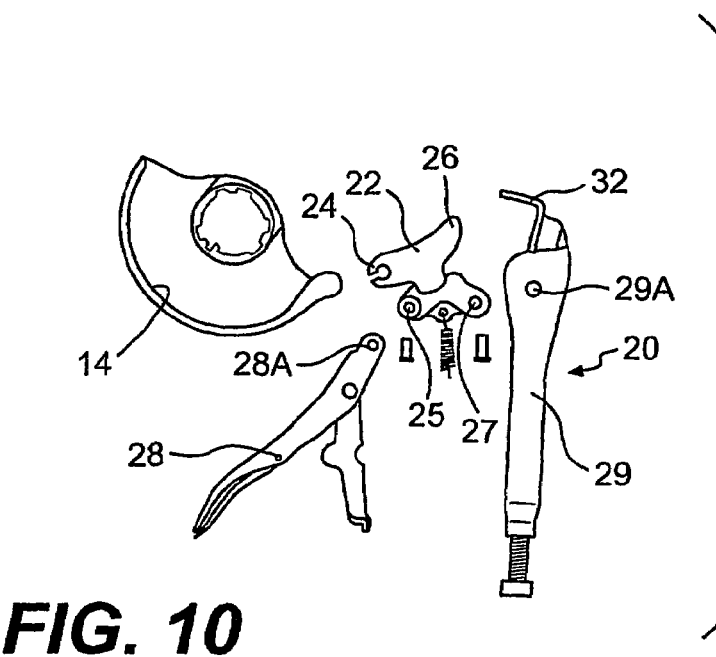
FIG. 10 is an exploded view illustrating the various components of the locking pliers.
Figure 11:
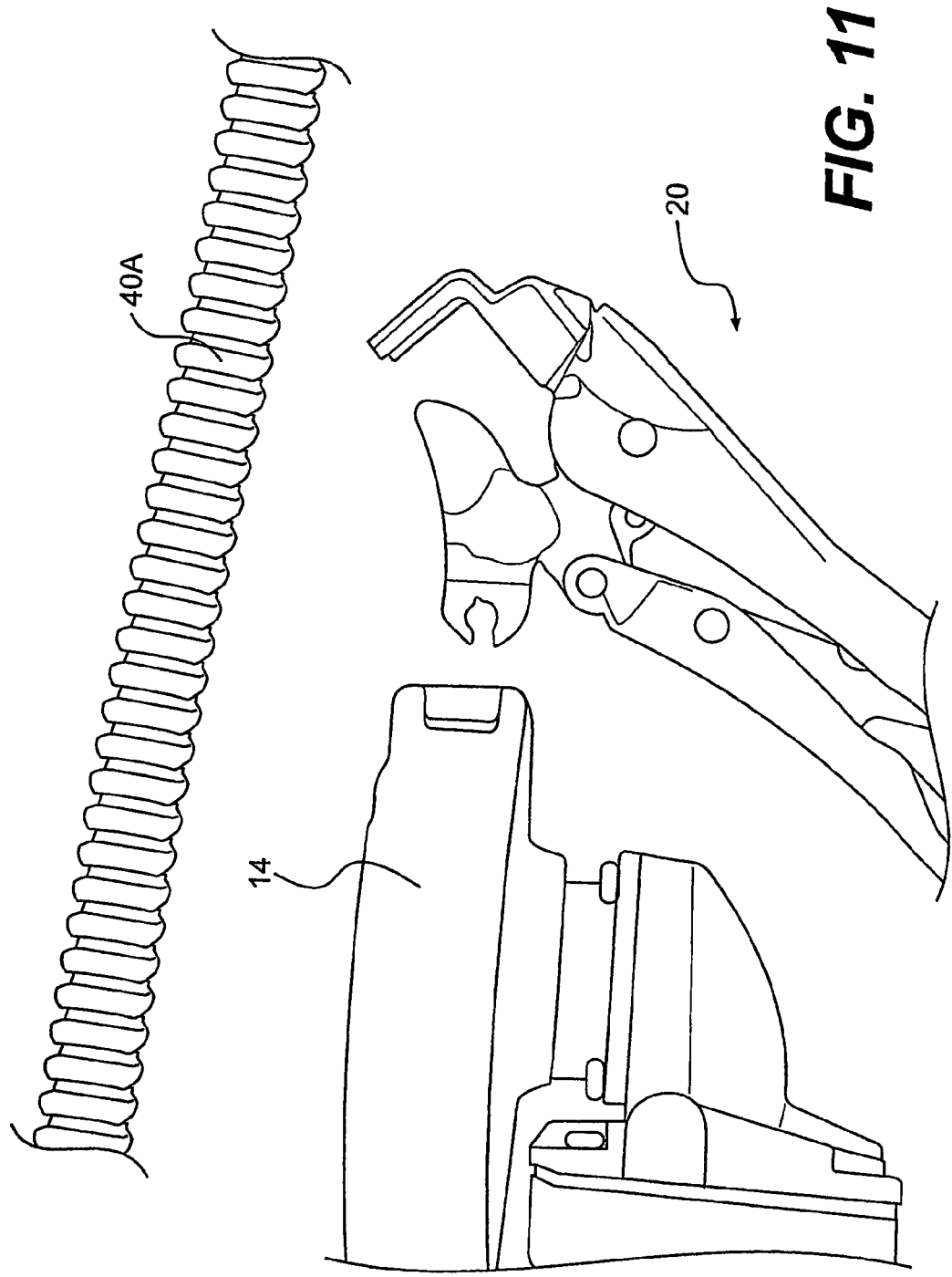
FIG. 11 is a top view illustrating the housing mounted on the power tool and a side view of the locking pliers being disposed in a disconnected position adjacent thereto.
Figure 12:
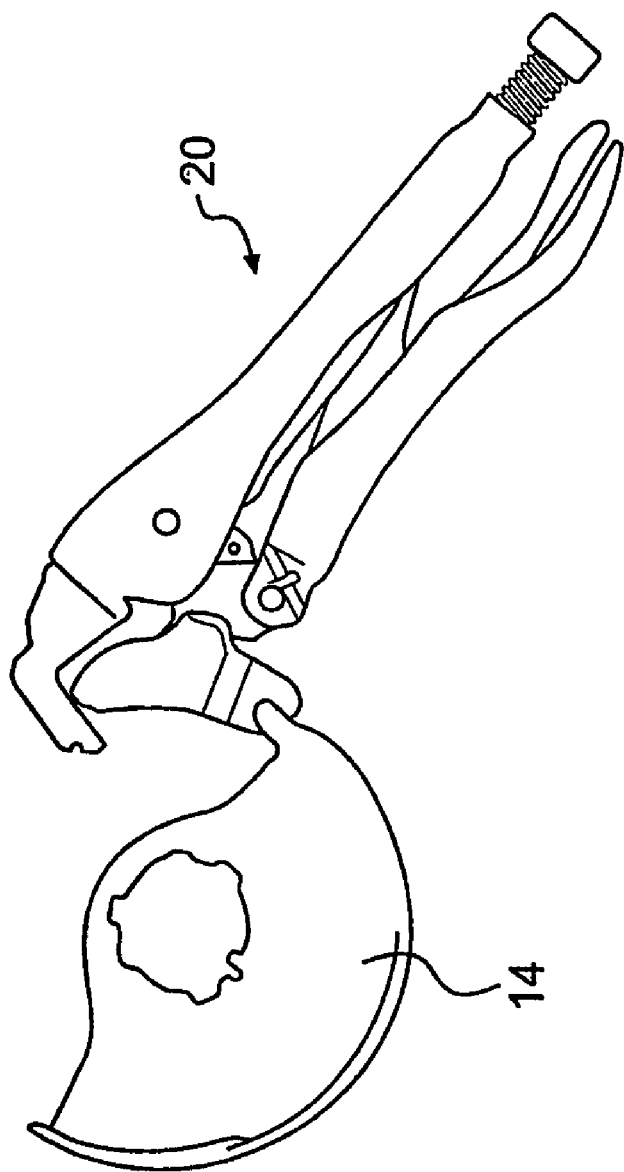
FIG. 12 is a side view illustrating the housing disengaged from the power tool and a side view of the locking pliers being disposed in a connected position relative to the housing.
Figure 13:
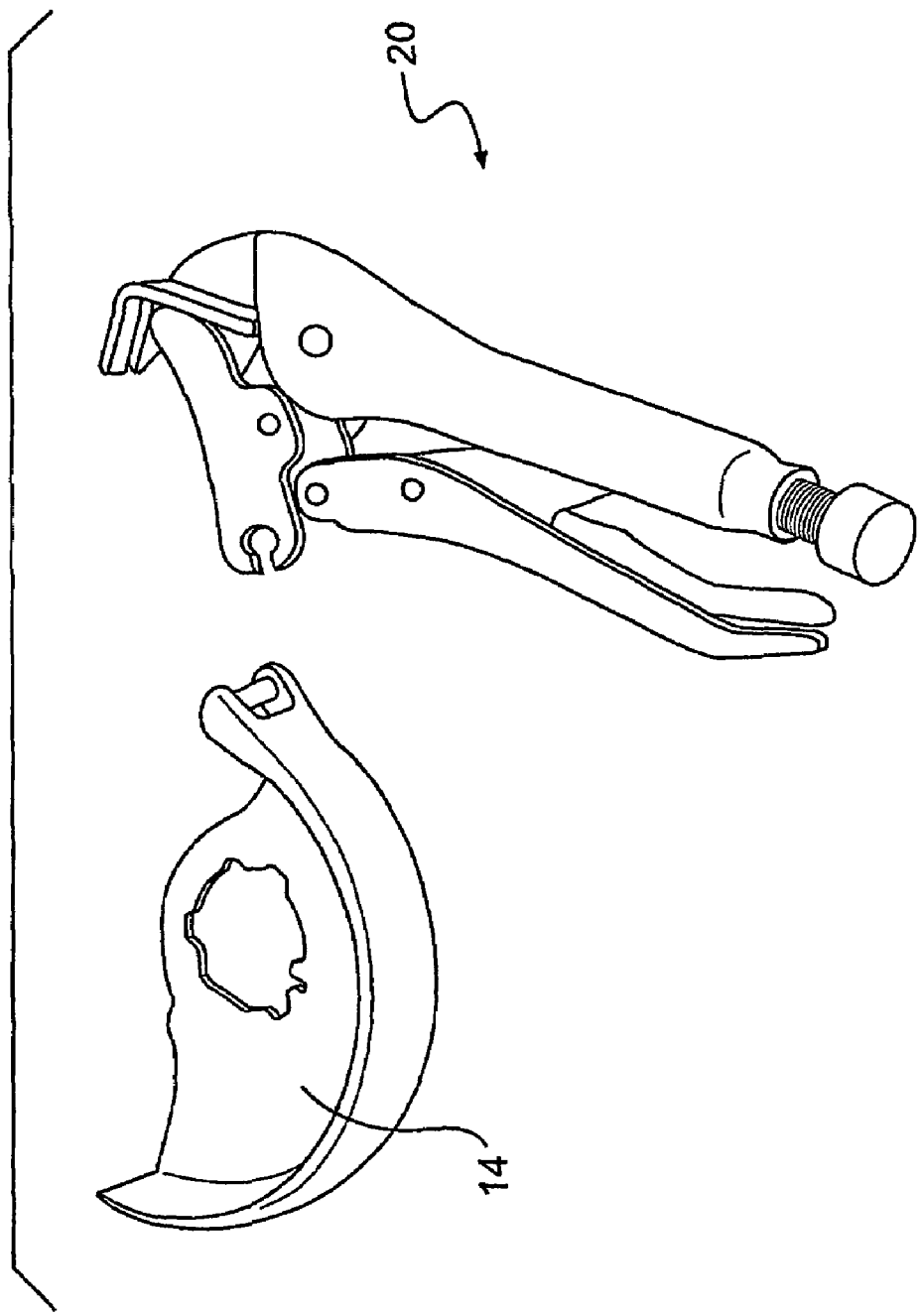
FIG. 13 is a side view illustrating the housing disengaged from the power tool and a side view of the locking pliers being disposed in a disconnected position relative to the housing.
Figure 14:
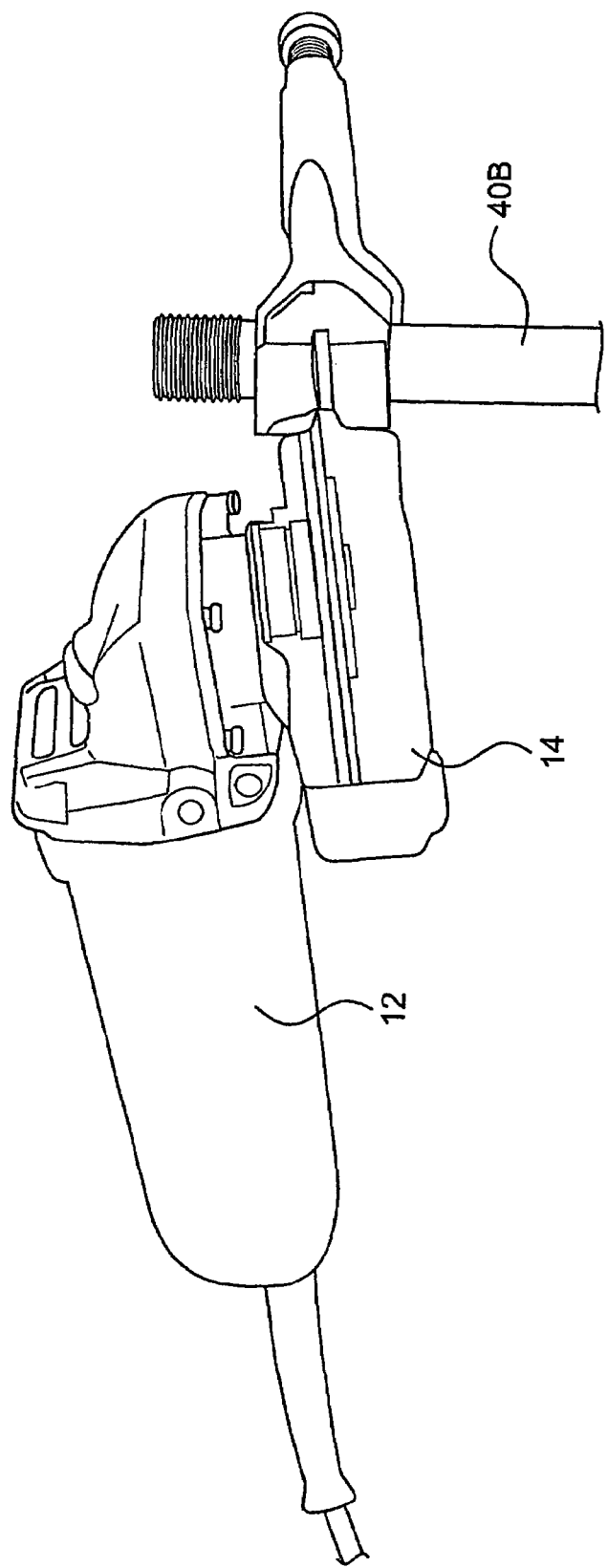
FIG. 14 is a top view illustrating the housing mounted on the power tool with an article locking pliers being engaged relative thereto and positioning an article that may be brought into engagement with the power tool.
Figure 15:
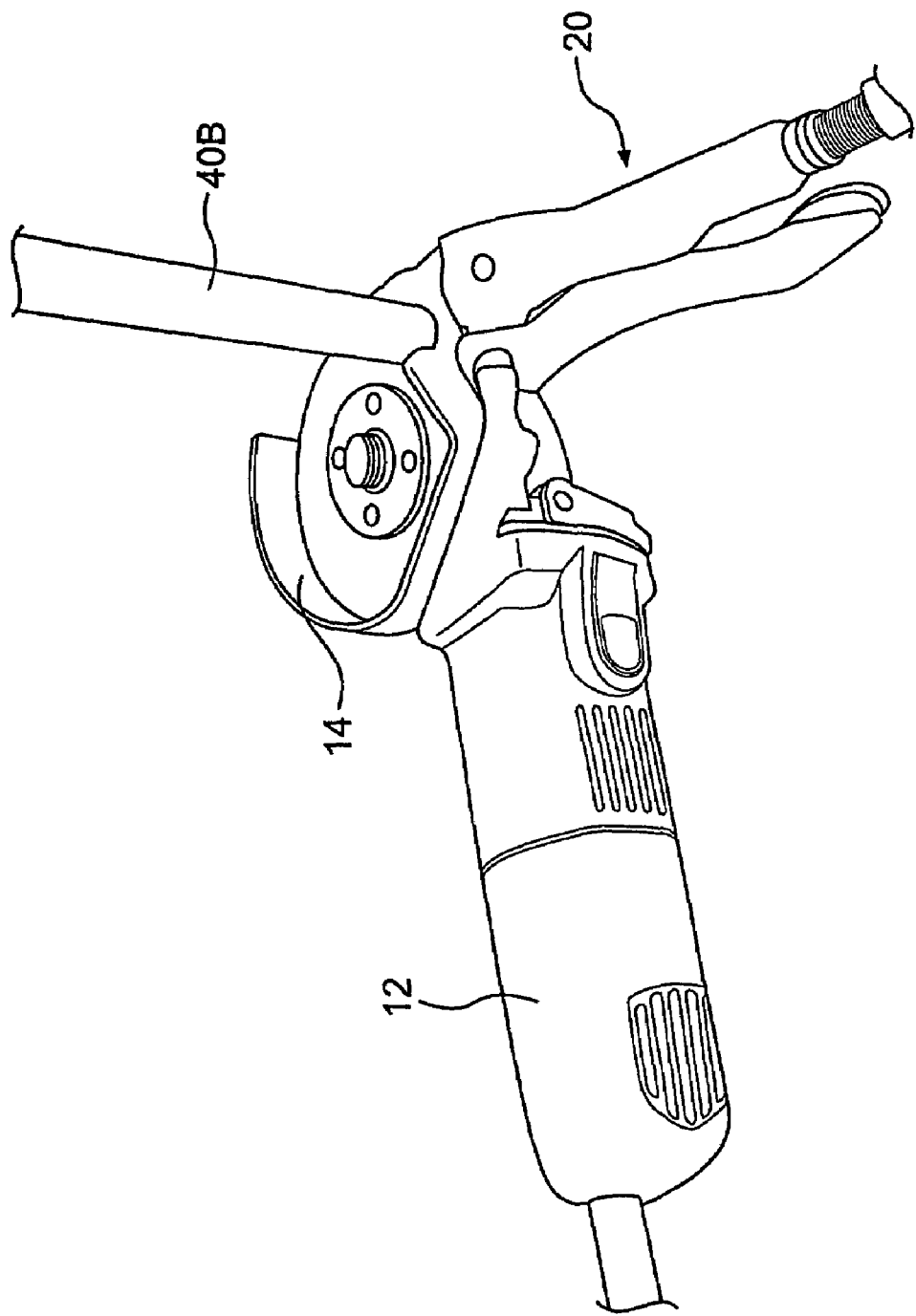
FIG. 15 is a perspective view illustrating the housing mounted on the power tool with an article locking pliers being engaged relative thereto and positioning an article that may be brought into engagement with the power tool by moving the locking pliers away from the power tool.
Figure 16:
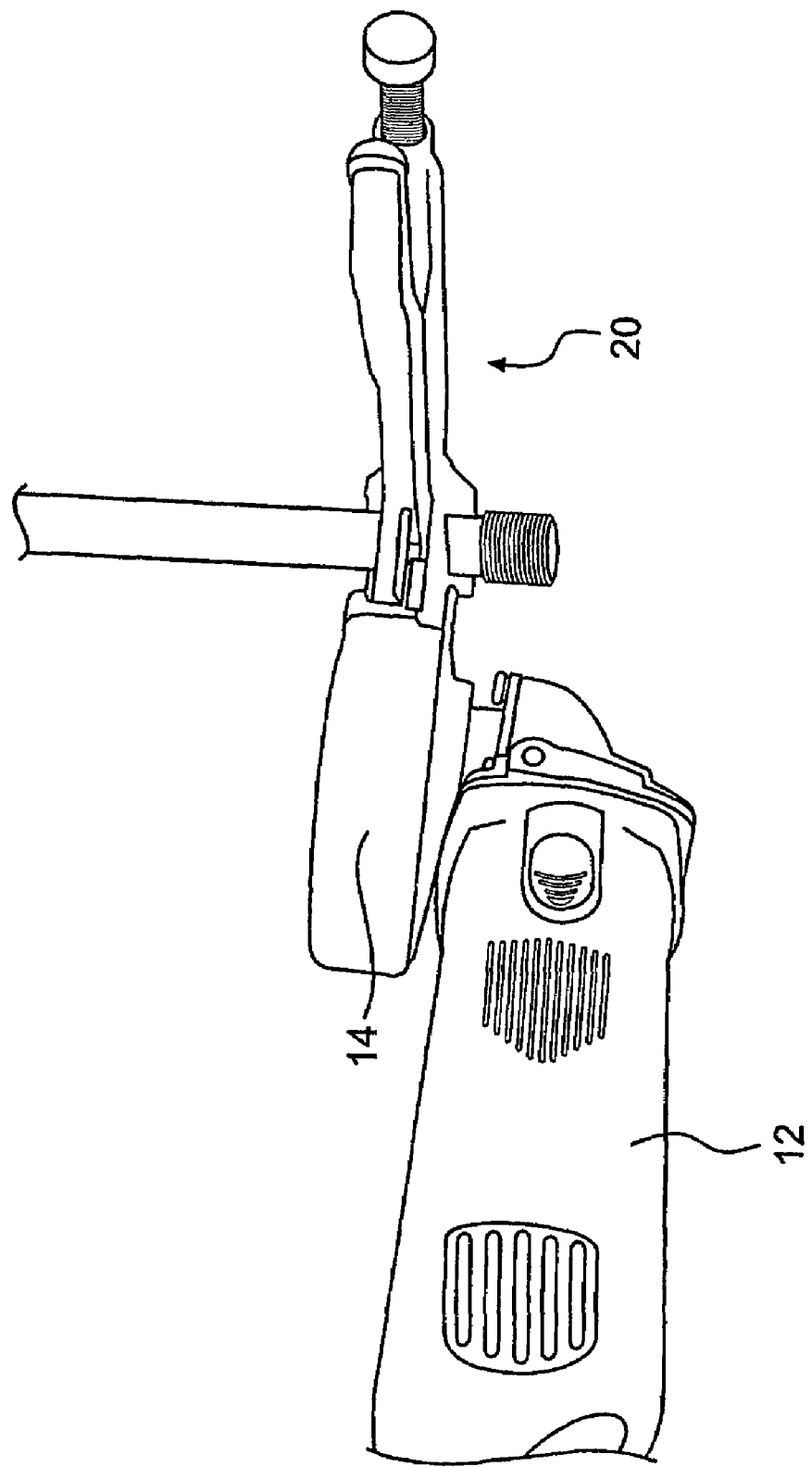
FIG. 16 is a top view illustrating the housing mounted on the power tool with an article locking pliers being engaged relative thereto and positioning an article that may be brought into engagement with the power tool by moving the locking pliers away from the power tool.

As illustrated in FIGS. 1-16, a locking pliers 20 is illustrated for use with a power tool 12 that includes a power tool attachment 10. A housing 14 is mounted on the power tool 12. The housing 14 includes at least one engaging portion 16 that may be in the form of a pin with two flat surfaces. A locking pliers 20 is provided having a retaining section 22 with a proximal end 24 and a distal end 26. The proximal end 24 is mounted on at least one engaging portion 16 to retain the locking pliers 20 in a movable relationship relative to the housing 14.

An engaging section 32 of the locking pliers 20 is mounted relative to the retaining section 22 and is selectively locked relative to the distal end 26 of the retaining section 22 for positioning an article 40A-40D therebetween. When an article 40A-40D is locked relative to the distal end 26 of the retaining section 22 and the engaging section 32 of the locking pliers 20, the proximal end 24 of the retaining section 22 can be selectively rotated relative to the housing 14 to permit the power tool 12 to come into engagement with the article 40A-40D. The proximal end 24 of the retaining section 22 is releasably positioned relative to the engaging portion 16 to permit the proximal end 24 to be received in the engaging portion 16 and for preventing the proximal end 24 from being released from the engaging portion 16 during normal use. The proximal end 24 may include a C-shaped slot with an entry section having two substantially flat sections for mating with the engaging portion 16 on the housing 14 in a first position for permitting the locking pliers 20 to be mounted relative to the housing 14 and preventing the locking pliers 20 from being removed from the housing 14 during operation of the power tool 12.

As illustrated in the FIGS. 9-12, the locking pliers 20 includes an actuating handle 28 that includes an aperture 28A that is pivotally connected to an aperture 25 in the retaining section 22. A gripping handle 29 is formed to include the engaging section 32. The engaging section 32 may be of any desired shape to accommodate an article 40A-40D that is designed to be received between the engaging section 32 and the distal end 26 of the retaining section 22. The gripping handle 29 includes an aperture 29A formed therein. The retaining section 22 includes a second aperture 27 that is pivotally connected to the aperture 29A in the gripping handle 29.

The proximal end 24 of the retaining section 22 includes a C-shaped opening that is designed to be received within a slot or engaging portion 16 of the housing 14. The retaining section 22 is designed to permit the locking pliers 20 to be selectively rotated relative to the housing 14 to permit an article 40A-40D to come into engagement with the power tool 12. Thus, the power tool attachment 10 can cut an "accurate" cut to a specific angle and can cut a "square" or 90° cut. The engaging portion 16 must be properly aligned with the proximal end 24 of the retaining section 22 to permit the proximal end 24 to be received within the engaging portion 16. When it is desired to disengage the locking pliers 20 from the housing 14, the two flat surfaces on the proximal end 24 are aligned with the slot in the engaging portion 16 to permit disengagement therefrom.

The engaging portion 16 is designed to fit relative to the proximal end 24 of the retaining section 22 by aligning the proximal end 24 with two flat surfaces on the engaging portion 16. When the proximal end 24 and the flat surfaces are aligned the locking pliers 20 can be connected to the housing 14. When the proximal end 24 is not aligned with the flat surfaces on the engaging portion 16, the locking pliers 20 can be rotated without being disengaged from the housing 14. In another embodiment, a pin with the two flat sections may be positioned on the proximal end 24 to be received within an aperture formed in the housing 14 to permit the locking pliers 20 to be selectively rotated relative to the housing 14 to permit an article to be cut.

In operation, a workpiece 40A-40D is positioned relative to the engaging section 32 and the distal end 26 of the retaining section is moved into position to lock the workpiece 40A-40D relative to the locking pliers 20. Thereafter, the proximal end 24 of the retaining section is aligned with the engaging portion 16 of the housing 14 to permit the proximal end 24 to be received within the engaging portion 16. Upon rotation of the locking pliers 20 relative to the housing 14, the proximal end 24 of the retaining section 22 is mounted relative to the housing 14 for selective rotation. In this position, the locking pliers 20 can be selectively rotated relative to the housing 14 but cannot be disengaged therefrom. The two flat sections permit the proximal end 24 to be mounted relative to the engaging portion 16 but prohibit the proximal end 24 from being disengaged after the proximal end 24 is rotated relative to the housing 14. The power tool 12 may be a rotary saw and the engaging section 32 may include a slot formed therein for permitting the rotary saw to sever a workpiece 40A-40D retained relative to said engaging section 32.

In the first embodiment, the locking pliers 20 is moved away from the power tool 12 so as to engage the workpiece 40A-40D with the blade of the power tool 12 to cut the workpiece 40A-40D. The locking pliers 20 is rotated about the engaging portion 16 to accurately position the workpiece 40A-40D relative to the blade of the power tool 12.

As illustrated in FIGS. 17-20, a locking pliers 200 is illustrated for use with a power tool 212 that includes a power tool attachment 210. A housing 214 is mounted on the power tool 212. The housing 214 includes at least one engaging portion 216 that may be in the form of a substantially cylindrical member with a narrow elongated slot formed at one side thereof The engaging portion 216 may be mounted relative to the housing 214 by means of bolts and nuts 218A, 218B.

A locking pliers 200 is provided with a retaining section 222 with a distal end and a proximal end 226. The proximal end 226 is mounted relative to the at least one engaging portion 216 to retain the locking pliers 200 in a movable relationship relative to the housing 214.

When an article 40A-40D is locked relative to the locking section 250 and the retaining section 222 of the locking pliers 200, the proximal end 226 of the retaining section 222 can be selectively rotated relative to the housing 214 to permit the power tool 212 to come into engagement with the article 40A-40D. The proximal end 226 of the retaining section 222 is releasably positioned relative to the engaging portion 216 to permit the proximal end 226 to be received in the engaging portion 216 and for preventing the proximal end 226 from being released from the engaging portion 216 during normal use.

Figure 17:
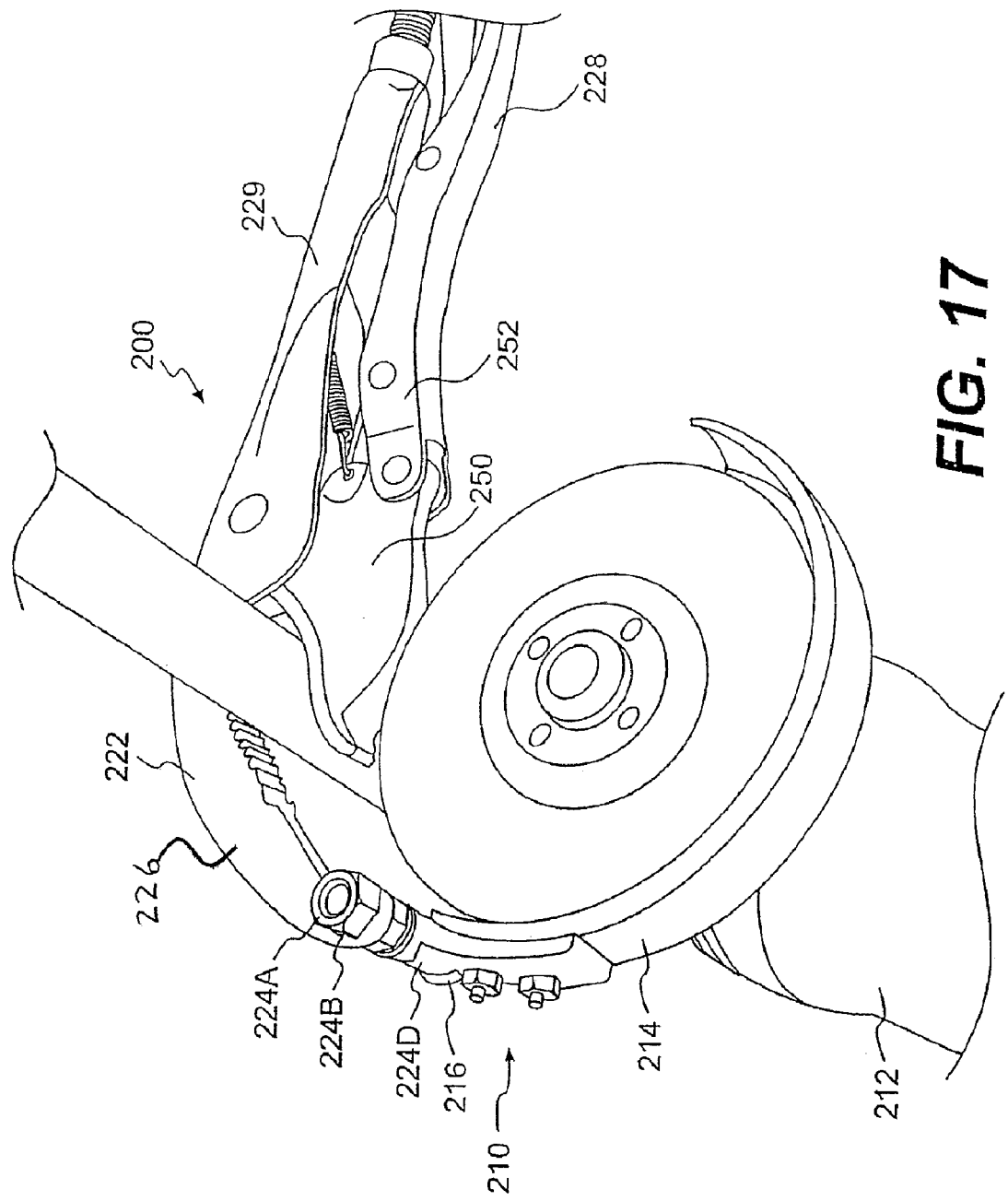
FIG. 17 is a perspective view of a second embodiment illustrating the housing mounted on the power tool with an article locking pliers being engaged relative thereto and positioning an article that may be brought into engagement with the power tool by moving the locking pliers towards the power tool.
Figure 18:
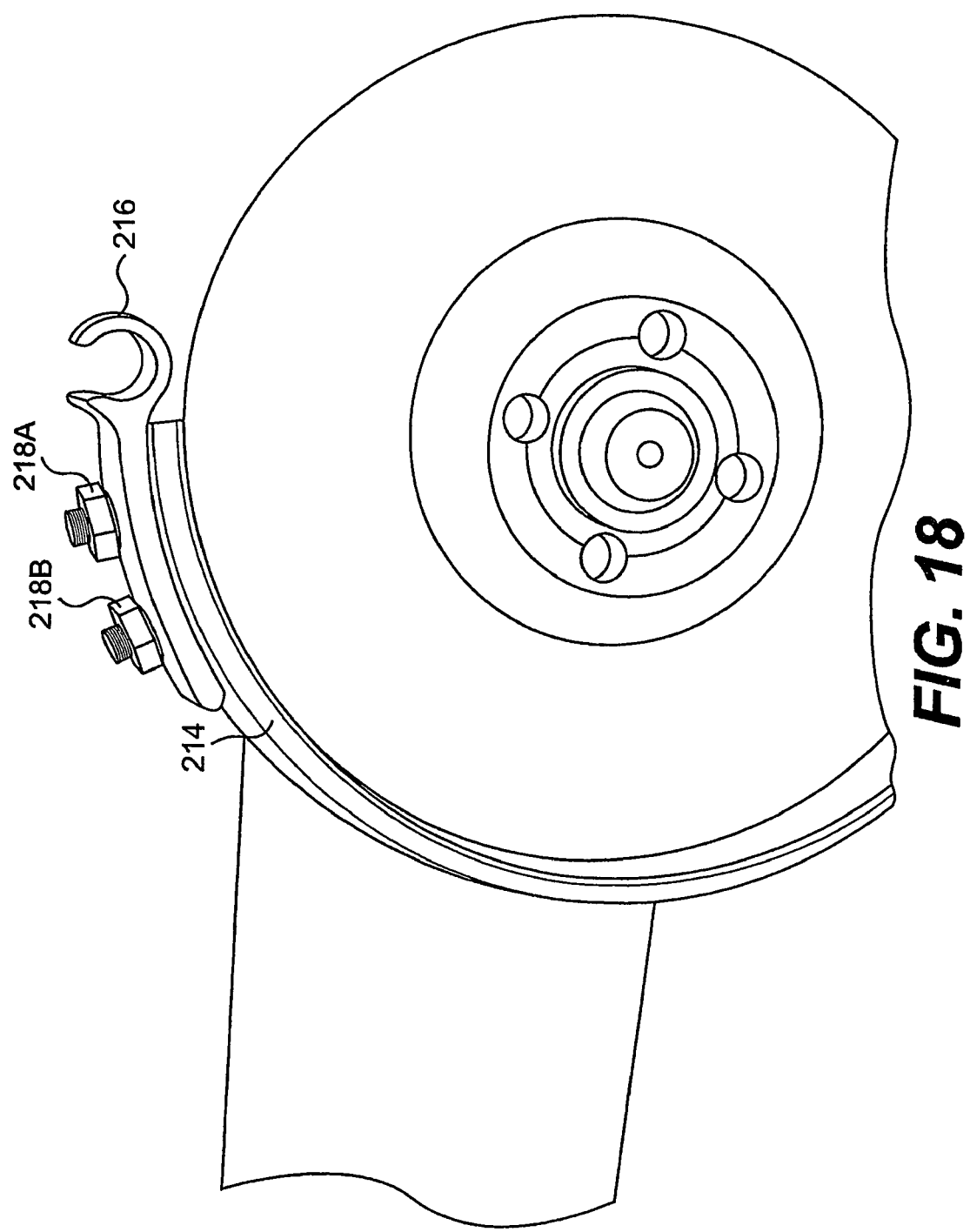
FIG. 18 is a front elevational view illustrating the engaging portion of the housing of the second embodiment.
Figure 19:
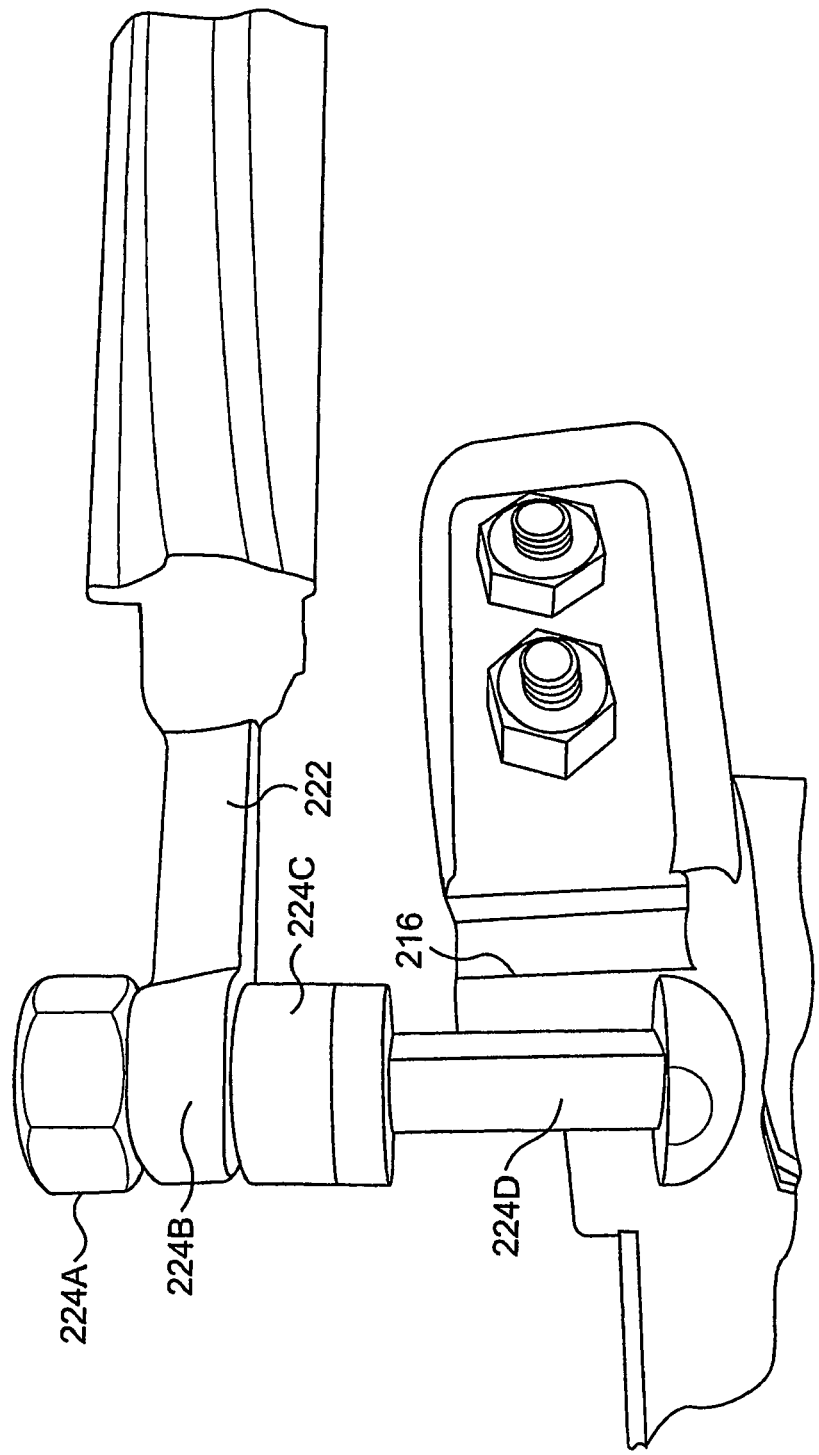
FIG. 19 is a side view illustrating the positioning of the distal end of the retaining section relative to the engaging portion of the housing of the second embodiment.

As illustrated in the FIG. 17, the locking pliers 200 includes an actuating handle 228 that includes a connector 252 for pivotally connecting the locking section 250 relative to the retaining section 222. A gripping handle 229 extends from the retaining portion 222. The retaining portion 222 may include a serrated section for accommodating any desired shape of an article 40A-40D that is designed to be received between the retaining portion 222 and the locking section 250. The gripping handle 229 includes a connector 260 for pivotally connecting the locking section 250 relative to the gripping handle 229 in an over-center relationship for locking the locking section 250 relative to the retaining section 222 when the locking pliers 200 is actuated.

The proximal end 226 of the retaining section 222 includes a projecting portion 224B with an aperture formed therein for receiving a connecting pin 224D that is secured relative to the proximal end 226 by means of bolts 224A and 224B. The pin 224D includes two flat sections for permitting the pin 224D to be received with the C-shaped cylindrical engaging portion 216. The retaining section 222 is designed to permit the locking pliers 200 to be selectively rotated relative to the housing 214 to permit an article 40A-40D to come into engagement with the power tool 212. Thus, the power tool attachment 210 can cut an "accurate" cut to a specific angle and can cut a "square" or 90 degree cut. The engaging portion 216 must be properly aligned with the proximal end 226 of the retaining section 222 to permit the pin 224D to be received within the engaging portion 216.

The engaging porting 216 is designed to fit relative to the pin 224D of the retaining section 222 by aligning the pin 224D that includes two flat surfaces with the elongated slot in the substantially cylindrical engaging portion 216. When the flat surfaces of the pin 224D are aligned, the locking pliers 200 can be connected to the housing 214. When the flat surfaces of the pin 224D are not aligned with the elongated slot in the substantially cylindrical engaging portion 216, the locking pliers 200 can be rotated without being disengaged from the housing 214.

In operation, a workpiece 40A-40D is positioned relative to the engaging section 232 and the locking section 250 is moved into position to lock the workpiece 40A-40D relative to the locking pliers 200. Thereafter, the proximal end 226 of the retaining section is aligned with the engaging portion 216 of the housing 214 to permit the pin 224D on the proximal end 226 to be received within the engaging portion 216. Upon rotation of the locking pliers 220 relative to the housing 214, the proximal end 226 of the retaining section 222 is mounted relative to the housing 214 for selective rotation. In this position, the locking pliers 200 can be selectively rotated relative to the housing 214 but cannot be disengaged therefrom. The two flat sections permit the pin 224D to be mounted relative to the engaging portion 216 but prohibit the proximal end 226 from being disengaged after the proximal end 226 is rotated relative to the housing 214.

In the second embodiment, the locking pliers 200 is moved towards the power tool 212 so as to engage the workpiece 40A-40D with the blade of the power tool 212 to cut the workpiece 40A-40D. The locking pliers 200 is rotated about the engaging portion 216 to accurately position the workpiece 40A-40D relative to the blade of the power tool 212. When it is desired to disengage the locking pliers 200 from the housing 214, the two flat surfaces on the pin 224D are aligned with the slot in the substantially cylindrical engaging portion 216 to permit disengagement therefrom. In the particular embodiment illustrated in the drawings, the power tools 12, 212 are a cutting saw and the locking pliers 20, 200 enables an individual to use the cutting saw to accurately cut an article 40A-40D.

The present invention permits an individual to easily operate a power tool while holding an article in a locking pliers that is mounted for rotation relative to the power tool. Thus, an individual can use one hand to control the operation of the power tool and the other hand to control the locking pliers. Further, an individual may perform accurate work on an article when the individual is working in the field without the need to use a vise.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clamping tool for use with a power tool comprising:
   a housing adapted to be mounted on a power tool, said housing including at least one engaging portion;
   a locking pliers having a retaining section with a proximal end and a distal end, said proximal end being adapted to be selectively, releasably mounted on the at least one engaging portion to selectively retain the locking pliers in a movable relationship relative to the housing and to selectively permit disengagement of the locking pliers relative to the housing;
   an engaging section of said locking pliers being pivotally mounted adjacent to the retaining section for selectively being locked relative to the retaining section of the locking pliers for positioning an article therebetween; and
   a pin comprising a head and a shank portion, at least a flat planar side on the shank portion having a predetermined width and extending along a predetermined length of the shank portion, said at least the flat planar side being selectively received within said engaging portion for selectively retaining locking pliers in the movable relationship relative to the housing and selectively permit disengagement of the locking pliers relative to the housing, said at least the flat planar side being positioned at a 90° angle relative to a cutting edge of a power tool for preventing disengagement of the locking pliers during a cutting operation;

wherein when an article is locked relative to the retaining section and the engaging section of the locking pliers, the proximal end of said retaining section can be rotated relative to the housing to permit a power tool to come into engagement with an article while enabling the proximal end of the retaining section to be selectively, releasably disengaged from the housing thereafter.

2. The clamping tool according to claim 1, and further including a cylindrical pin with two flat surfaces at the engaging portion of said housing, said pin being positioned at a 90° angle relative to a cutting edge of a power tool for preventing disengagement of the locking pliers during a cutting operation.

3. The clamping tool according to claim 1, wherein said housing is substantially circular for substantially surrounding a cutting wheel of a power tool with a space being provided for permitting the cuffing wheel to engage an article, and said at least one engaging portion is a slot formed at one end of the housing for selectively mating with said proximal end of said retaining section for selectively permitting rotation therebetween.

4. The clamping tool according to claim 1, wherein the proximal end of said retaining section includes a slot formed therein for being received within the at least one engaging portion formed in said housing.

5. The clamping tool according to claim 4, wherein said slot is a substantially C-shaped slot with an entry section having two substantially flat sections for mating with the at least one engaging portion on said housing in a first position for permitting the locking pliers to be mounted relative to said housing and for preventing said locking pliers from being removed from the housing during operation of the power tool.

6. The clamping tool according to claim 1, wherein the locking pliers is moved away from the power tool during operation to permit an article to be engaged with the power tool.

7. The clamping tool according to claim 1, wherein the power tool is a rotary saw.

8. The clamping tool according to claim 1, wherein the engaging section is a substantially L-shaped member for positioning an article between said L-shaped member and the distal end of the retaining section in a locked position.

9. The clamping tool according to claim 1, wherein said power tool is a rotary saw and said engaging section includes a slot formed therein for permitting said rotary saw to sever an article retained relative to said engaging section.

10. A clamping tool for use with a power tool comprising:
a housing adapted to be mounted on a power tool, said housing including at least one engaging portion;
a locking pliers having a retaining section with a proximal end and a distal end, said proximal end being adapted to be selectively, releasably mounted on the at least one engaging portion to selectively retain the locking pliers in a movable relationship relative to the housing and to selectively permit disengagement of the locking pliers relative to the housing;
an engaging section of said locking pliers being pivotally mounted in an over-center relationship relative to a portion adjacent to the retaining section for selectively locking the engaging section of the locking portion relative to the retaining section of the locking pliers for positioning an article therebetween; and
a pin comprising a head and a shank portion, at least a flat planar side on the shank portion having a predetermined width and extending along a predetermined length of the shank portion, said at least the flat planar side being selectively received within said engaging portion for selectively retaining locking pliers in the movable relationship relative to the housing and selectively permit disengagement of the locking pliers relative to the housing, said at least the flat planar side being positioned at a 90° angle relative to a cutting edge of a power tool for preventing disengagement of the locking pliers during a cutting operation;

wherein when an article is selectively locked relative within the portion adjacent to the retaining section of the locking portion and the engaging section of the locking pliers, the distal end of said retaining section can be rotated relative to the housing to permit a power tool to come into engagement with an article while enabling the proximal end of the retaining section to be selectively, releasably disengaged from the housing thereafter.

11. The clamping tool according to claim 10, and further including a pin with two flat surfaces mounted at the distal end, said pin being positioned at a 90° angle relative to a cutting edge of a power tool for preventing disengagement of the locking pliers during a cutting operation.

12. The clamping tool according to claim 10, wherein said housing is substantially circular for substantially surrounding a cutting wheel of a power tool with a space being provided for permitting the cutting wheel to engage an article, and said at least one engaging portion is a slot formed at one end of the housing for selectively mating with said distal end of said retaining section for selectively permitting rotation therebetween.

13. The clamping tool according to claim 10, wherein the distal end of said retaining section includes a pin for being received within the at least one engaging portion formed in said housing.

14. The clamping tool according to claim 13, wherein said at least one engaging portion is a slot with a substantially C-shape with an entry section having two substantially flat sections for mating with said pin, wherein positioning the locking pliers relative to said housing in a first position permits the locking pliers to be mounted relative to said housing and prevents said locking pliers from being removed from the housing during operation of the power tool.

15. The clamping tool according to claim 10, wherein the locking pliers is moved towards the power tool during operation to permit an article to be engaged with the power tool.

16. The clamping tool according to claim 10, wherein the power tool is a rotary saw.

17. The clamping tool according to claim 10, wherein the engaging section is a serrated member for positioning an article between said serrated member and the locking portion in a locked position.

* * * * *